(12) United States Patent
Mittu et al.

(10) Patent No.: US 8,383,969 B2
(45) Date of Patent: Feb. 26, 2013

(54) APPARATUS INCLUDING A CIRCUIT BREAKER RETAINING MECHANISM FOR USE IN WITHDRAWABLE CIRCUIT BREAKERS AND METHOD OF OPERATING THE SAME

(75) Inventors: Mahadeva Mittu, Belgaum (IN); Adam Skrudlik, Bielsko-Biala (PL); Tomasz Ignasiak, Bielsko-Biala (PL); Lars Pommerencke, Neumunster (DE)

(73) Assignee: General Electric Company, Schenectady, NY (US)

( * ) Notice: Subject to any disclaimer, the term of this patent is extended or adjusted under 35 U.S.C. 154(b) by 943 days.

(21) Appl. No.: 12/198,434

(22) Filed: Aug. 26, 2008

(65) Prior Publication Data
US 2010/0025201 A1 Feb. 4, 2010

(30) Foreign Application Priority Data
Aug. 1, 2008 (PL) .......................................... 385807

(51) Int. Cl.
*H01H 11/00* (2006.01)
(52) U.S. Cl. ..................................... 200/50.21; 361/605
(58) Field of Classification Search ............... 200/50.01, 200/50.02, 50.17, 50.21–50.26; 361/605–618
See application file for complete search history.

(56) References Cited

U.S. PATENT DOCUMENTS
4,743,715 A * 5/1988 Gerbert-Gaillard et al. .......................... 200/50.26

FOREIGN PATENT DOCUMENTS

| DE | 10203700 C1 | 5/2003 |
|---|---|---|
| EP | 0925624 A2 | 6/1999 |
| EP | 0951123 A1 | 10/1999 |
| EP | 2019406 A1 | 1/2009 |
| FR | 2594266 A1 | 8/1987 |
| PL | 198343 B1 | 6/2008 |
| WO | 9845862 A2 | 10/1998 |
| WO | 0171869 A2 | 9/2001 |

OTHER PUBLICATIONS

English Abstract for FR2594266(A1); Publication date: Aug. 14, 1987; 1 pg.
English Abstract for EP0951123(A1); Publication date: Oct. 20, 1999; 1 pg.
European Search Report for Application No. 09166409.4; Mailing date: Nov. 24, 2009; 5 pgs.
Polish Search Report for Polish Application No. P-385-807; Filing date: Aug. 25, 2008; 2 pgs.

* cited by examiner

*Primary Examiner* — Amy Cohen Johnson
*Assistant Examiner* — Marina Fishman
(74) *Attorney, Agent, or Firm* — Cantor Colburn LLP

(57) ABSTRACT

A draw-out type circuit breaker apparatus is provided and includes a base from which a circuit breaker is selectively dismounted and moved along a first portion of a dismounting path into a disconnected position, a plate, fixed to the base, which is configured to guide the movement of the circuit breaker along the dismounting path, and a toggle link, coupled to the plate and biased to remain in a locking position, which is configured to block the circuit breaker from moving along the dismounting path beyond the disconnected position while the toggle link remains in the locking position, and to cause the circuit breaker to freely move from the disconnected position and along a second further portion of the dismounting path upon a temporary defeat of the bias thereof.

19 Claims, 1 Drawing Sheet

Figure 1:
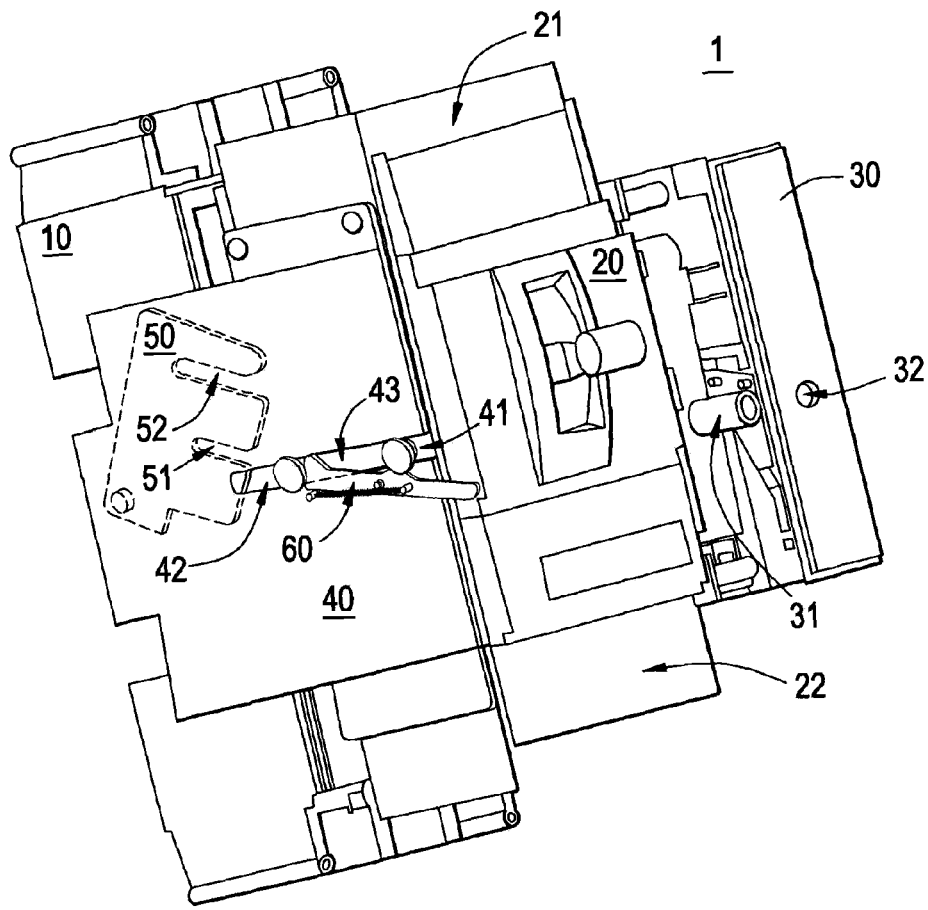

APPARATUS INCLUDING A CIRCUIT BREAKER RETAINING MECHANISM FOR USE IN WITHDRAWABLE CIRCUIT BREAKERS AND METHOD OF OPERATING THE SAME

CROSS REFERENCE TO RELATED APPLICATIONS

This application claims priority to Application No. P385807, filed Aug. 1, 2008 in Poland, the contents of which are incorporated herein by reference thereto.

BACKGROUND OF THE INVENTION

1. Field of the Invention

Aspects of the present invention are directed to circuit breaker apparatuses and, more particularly, to circuit breaker apparatuses including a circuit breaker retaining mechanism.

2. Description of the Background

Circuit breakers are capable of interrupting high ampere current in various industrial, commercial or personal electrical applications and may be categorized generally as draw-out types of circuit breakers and fixed types of circuit breakers. In that capacity, draw-out types of circuit breakers may be attached to circuitry and, during their respective lifecycles, may need to be serviced or replaced. As such, it is desirable to construct draw-out types of circuit breakers which are relatively easily and safely serviced or, when necessary, replaced.

In conventional draw-out types of circuit breakers, an operator may easily be able to draw a circuit breaker out from a system and, just as easily, mishandle the operation and/or damage the circuit breaker.

Conversely, other draw-out systems employ a feature that prevents such damage but also makes servicing the circuit breaker complicated and inefficient. Generally, in these systems, a lever protrudes from a front panel. The operator elevates the lever and simultaneously withdraws the circuit breaker from the system. As such, it is required that the operator devote one hand to elevating the lever and the other hand to withdrawing the circuit breaker which may be difficult.

As an additional matter, in the systems employing the above noted feature, the lever is positioned in such a location as to prevent the overall system from being IP40 compliant, which is acceptable for the intended purpose of such systems, but still leaves room for improvement.

SUMMARY OF THE INVENTION

In accordance with an aspect of the invention, a draw-out type circuit breaker apparatus, including a circuit breaker configured to interrupt current in an electric circuit, is provided and includes a base from which the circuit breaker is selectively dismounted and moved along a first portion of a dismounting path into a disconnected position, a plate, fixed to the base, which is configured to guide the movement of the circuit breaker along the dismounting path, and a toggle link, coupled to the plate and biased to remain in a locking position, which is configured to block the circuit breaker from moving along the dismounting path beyond the disconnected position while the toggle link remains in the locking position, and to cause the circuit breaker to freely move from the disconnected position and along a second further portion of the dismounting path upon a temporary defeat of the bias thereof.

In accordance with an aspect of the invention, a draw-out type circuit breaker apparatus, including a circuit breaker configured to interrupt current in an electric circuit, is provided and includes a base from which the circuit breaker is selectively dismounted and moved along a first portion of a dismounting path into a disconnected position, a plate, fixed to the base, which is configured to guide the movement of the circuit breaker along the dismounting path, and a toggle link, coupled to the plate and biased to remain in a locking position, which is configured to block the circuit breaker from moving along the dismounting path beyond the disconnected position while the toggle link remains in the locking position, and to free the circuit breaker to move from the disconnected position and along a second further portion of the dismounting path upon a temporary defeat of the bias thereof.

In accordance with an aspect of the invention, a method of operating a draw-out type circuit breaker apparatus, including a circuit breaker configured to interrupt current in an electric circuit, is provided and includes dismounting the circuit breaker from a base of the circuit breaker apparatus, moving the circuit breaker along a first portion of a dismounting path and into a disconnected position, temporarily operating a toggle link to cause the circuit breaker to freely move from the disconnected position and along a second portion of the dismounting path, and selectively removing the circuit breaker from the dismounting path.

BRIEF DESCRIPTIONS OF THE DRAWINGS

Figure 2:
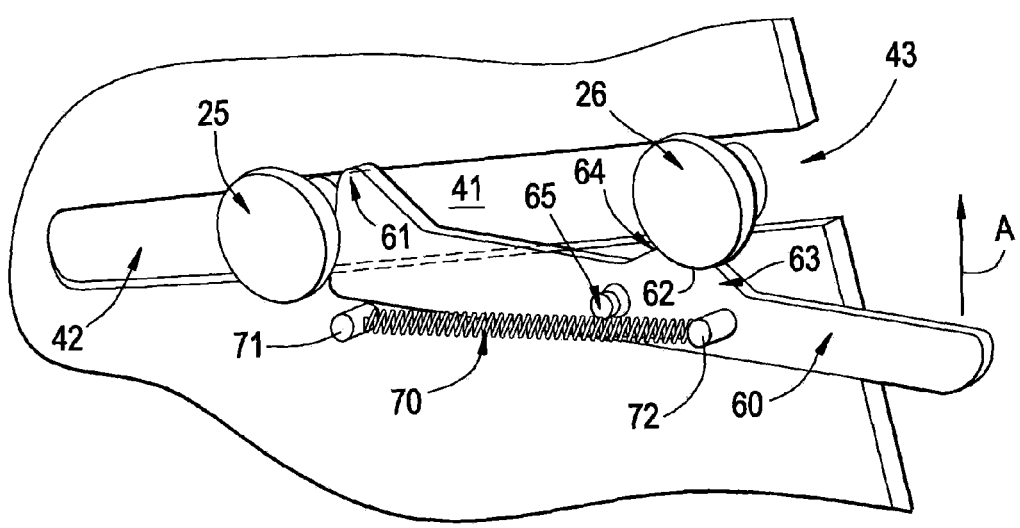

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a perspective view of an exemplary draw-out type circuit breaker apparatus in accordance with an embodiment of the invention; and FIG. 2 is an expanded perspective view of the draw-out type circuit breaker apparatus of FIG. 1.

DETAILED DESCRIPTION OF THE INVENTION

With reference to FIGS. 1 and 2, a draw-out type of circuit breaker apparatus 1 is provided. As in many cases, the circuit breaker apparatus 1 is installed on or in a power system and is capable of interrupting low to high ampere current in various industrial, commercial or personal electrical applications. To that end, the circuit breaker apparatus 1 includes a circuit breaker 20, having upper and lower gripping portions 21 and 22, which is configured to, e.g., interrupt current in an electric circuit onto which the circuit breaker apparatus 1 is installed.

In addition, the circuit breaker apparatus 1 also includes a base 10, a plate 40 and a toggle link 60. The circuit breaker 20 is selectively mounted to and dismounted from the base 10 by an operator of the circuit breaker apparatus 1 or some other suitable individual. When the circuit breaker 20 is to be dismounted from the base 10, the circuit breaker 20 is initially required to be removed from a connected position at which the circuit breaker 20 is connected to the base 10. Subsequently, the circuit breaker 20 is moved along a first portion 42 of a dismounting path and into a disconnected position.

The plate 40 is integrally fixed to the base 10 or, alternately, fixed to the base 10 by attachment devices and is configured to guide the movement of the circuit breaker 20 along the dismounting path. The toggle link 60 is coupled to the plate 40 and biased to remain in a locking position. As long as the toggle link 60 remains in the locking position, the toggle link 60 is configured to block the circuit breaker 20 from moving along the dismounting path beyond the disconnected position. However, once the toggle link 60 is removed from the locking position, such as by a defeat of the bias thereof, the toggle 60 is further configured to cause the circuit breaker 20 to freely move from the disconnected position and along a second portion 43 of the dismounting path.

In accordance with an embodiment, it is seen that a slot 41 is defined in the plate 40 with a length and an orientation that reflect those of the first and second portions 42, 43 of the dismounting path. First and second guide pins 25 and 26 are coupled to the circuit breaker 20 and restrained by the slot 41 during the mounting and dismounting operations. That is, the first and second guide pins 25 and 26 are guided within the slot 41 during the movement of the circuit breaker 20 along the dismounting path.

The toggle link 60 includes a main body, which is rotatably coupled to the plate 40 at a selected position 65 along a longitudinal length thereof, at which a boss may be disposed to couple the toggle link 60 to the plate 40, as well as first and second protrusions 61 and 62. The first and second protrusions 61 and 62 each protrude from an edge of the main body. The first protrusion 61 is configured to abut the first guide pin 25 or to otherwise prevent the first guide pin 25 from traversing the slot 41 in a direction away from the base 10 while the circuit breaker 20 is in the disconnected position and while the toggle link 60 remains in the locking position. The second protrusion 62 is configured to impart a force directed away from the base 10 the second guide pin 26 upon the temporary defeat of the bias of the toggle link 60.

In accordance with an embodiment, the temporary defeat of the bias of the toggle link 60 is achieved by an application of force A onto a leading portion of the toggle link 60. Of course, however, it is understood that other methods are available by which the bias of the toggle link 60 may be defeated.

The biasing of the toggle link 60 to remain in the locking position is generating by an elastic element 70. The elastic element 70 is attached at a first end thereof to a base plate boss 71 and at a second end thereof to a toggle link boss 72. The base plate boss 71 is disposed on the base plate 40 and proximate an edge of the toggle link 60 that opposes the edge of the toggle link 60 from which the first and second protrusions 61 and 62 protrude. The toggle link boss 72 is disposed on the toggle link 60 forward of the selected position 65. An elasticity of the elastic element 70 is set to bias the toggle link 60 to normally remain in the locking position. The elasticity is also set to allow the toggle link 60 to be at least temporarily rotated in the counterclockwise direction during, e.g., the defeat of the bias, and to allow the toggle link 60 to additionally be at least temporarily rotated in the clockwise direction.

In accordance with an embodiment, the first protrusion 61 is partially-humped shaped and includes an abutment surface which is configured to stably abut a leading portion of the first guide pin 25. The second protrusion 62, on the other hand, is hump shaped and includes force imparting and force receiving surfaces 63 and 64. The force imparting surface 63 imparts a force directed away from the base 10 to a rear portion of the second guide pin 26 during the temporary defeat of the bias of the toggle link 60.

That is, when the force A is applied to the leading portion of the toggle link 60, the toggle link 60 rotates in the counterclockwise direction such that the leading portion of the toggle link 60 is forced upwards against the bias of the toggle link 60 and such that the force imparting surface 63 eventually impacts the rear portion of the second guide pin 26. This impact applies a force to the second guide pin 26 that is directed away from the base 10 and thereby prompts the circuit breaker 20 to move away from the base 10. Since the toggle link 60 is rotatably coupled to the plate 40 at the selected position 65, when the force A is applied to the leading portion of the toggle link 60, the trailing portion of the toggle link 60 correspondingly descends. As a result, the first protrusion 61 releases the first guide pin 25 from the abutment situation just as or immediately preceding the impact of the force imparting surface 63 with the second guide pin 26. Thus, the first guide pin 25 is allowed to traverse the slot 41 and the circuit breaker 20 is allowed and caused to move away from the base 10 when the force imparting surface 63 impacts the second guide pin 26.

Once the circuit breaker 20 is moved in this manner, the application of the force A onto the leading portion of the toggle link 60 can be released and the operator of the circuit breaker apparatus 1 can relatively easily complete the dismounting operation by gripping the upper and lower gripping portions 21, 22 of the circuit breaker 20 with, what could be, his free hands. This process is facilitated by the interaction of the first guide pin 25 and the force receiving surface 64 of the toggle link 60. That is, as the circuit breaker 20 moves along the second portion 42 of the dismounting path away from the disconnected position, the first guide pin 25 traverses the slot 41 and eventually impacts the force receiving surface 64. At this point, a downward force is transmitted to the toggle link 60 which causes the toggle link 60 to rotate in the clockwise direction and thereby clear a path for the first guide pin 25 and the circuit breaker 20.

Conversely, when the circuit breaker 20 is to be mounted to the base 10, the circuit breaker 20 is placed proximate the base 10 such that the first and second guide pins 25 and 26 enter slot 41. As the circuit breaker 20 approaches the base 10 from this position, the first and second guide pins 25 and 26 respectively and sequentially impact the force imparting surface 63 of the second protrusion and a forward angled surface of the first protrusion 61. In each case, the impacts clear the slot 41 and the dismounting path and allow the circuit breaker 20 to proceed toward the base 10.

In accordance with an embodiment, the circuit breaker apparatus 1 may further include a locking mechanism 30 which is configured to lock the circuit breaker 20 onto the base 10 during a locking operation, subsequent to the mounting operation, as described above, and to unlock the circuit breaker from the base 10 during an unlocking operation which precedes the dismounting operation, as also described above.

The locking mechanism 30 may be disposed in a front of the circuit breaker apparatus 1 as part of a front panel, which includes a cam controlling assembly having a screw 31 and a through-hole 32. As shown, the through-hole 32 is defined in the front panel and allows for operator access to the screw 31. The screw 31 is coupled to a cam 50, which is disposed on the plate 40, such that when the screw 31 is turned, the cam 50 rotates. The cam 50 is configured with cam slots 51 and 52 which are configured to respectively grip the first and second guide pins 25 and 26 during the locking operation and to respectively release the first and second guide pins during the unlocking operation. With the front panel constructed as described herein, the circuit breaker apparatus 1 has an additional advantage of being IP40 compliant as would be understood by an operator thereof.

In accordance with this embodiment, the cam slots 51 and 52 and the rotation timing of the cam 50 may be arranged such that, e.g., the cam slot 52 grips and releases the first guide pin 25 with the circuit breaker 20 in the connect and disconnected position respectively. In this way, the movement of the circuit breaker 20 away from the base 10 and into the disconnected position as well as the movement of the circuit breaker 20 toward the base 10 from the disconnected position can be controlled by a turning of the screw 31 by the operator.

In accordance with a further aspect of the invention, it is understood that the toggle link 60 may be configured to block the circuit breaker 20 from moving along the dismounting path beyond the disconnected position while the toggle link 60 remains in the locking position, and to free the circuit breaker 20 to move from the disconnected position and along a second further portion of the dismounting path upon a temporary defeat of the bias thereof. Here, the toggle link 60 does not necessarily cause or force the circuit breaker 20 to move away from the base 10 but does, in any effect, allow the toggle link 60 to be released by the operator such that the operator can devote free hands to the removal of the circuit breaker from the dismounting path.

In addition, in accordance with another aspect of the invention, a method of operating a draw-out type circuit breaker apparatus 1, including a circuit breaker 20 configured to interrupt current in an electric circuit, is provided and includes dismounting the circuit breaker 20 from a base 10 of the circuit breaker apparatus 1, moving the circuit breaker 20 along a first portion 42 of a dismounting path and into a disconnected position, temporarily operating a toggle link 60 to cause the circuit breaker 20 to freely move from the disconnected position and along a second portion 43 of the dismounting path, selectively removing the circuit breaker 20 from the dismounting path.

In accordance with this aspect, the temporary operating of the toggle link 60 includes temporarily urging the toggle link 60 against a bias thereof, and ceasing the temporary urging of the toggle link 60 against the bias thereof once the circuit breaker 20 is caused to freely move from the disconnected position and along the second portion of the dismounting path.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A draw-out type circuit breaker apparatus, including a circuit breaker configured to interrupt current in an electrical circuit, the apparatus comprising:
   a base from which the circuit breaker is dismountable and movable;
   a plate, fixed to the base, comprising a slot that defines a first portion and a second portion of a dismounting path, the plate being configured to guide a movement of the circuit breaker along the first portion of the dismounting path into a disconnected position; and
   a toggle link, coupled to the plate and configured to be biased to remain in biased toward a locking position, the toggle link being configured to:
   block a first movement of the circuit breaker along the dismounting path beyond the disconnected position while the toggle link is disposed in the locking position, and to:
   facilitate a second movement of the circuit breaker from the disconnected position and along the second portion of the dismounting path upon a third movement of the toggle link out of the locking position.

2. The apparatus according to claim 1, further comprising first and second guide pins coupled to the circuit breaker and disposed to be guidable along and within the slot.

3. The apparatus according to claim 2, wherein the toggle link comprises:
   a main body which is rotatably coupled to the plate at a a a position along a length thereof, the main body comprising a first protrusion disposed on a first side of the position and a second protrusion disposed on a second opposing side of the position;
   the first protrusion being disposed and configured to abut the first guide pin while the circuit breaker is in the disconnected position and while the toggle link is disposed in the locking position; and
   the second protrusion being disposed and configured to impart a force directed away from the base to the second guide pin when the second protrusion is.

4. The apparatus according to claim 3, wherein the first protrusion comprises an abutment surface configured to stably abut the first guide pin.

5. The apparatus according to claim 3, wherein the second protrusion comprises:
   a first surface, which is configured to impart a first force directed to the second guide pin when the second protrusion is pivotally rotated about the position to the second guide pin; and
   a second surface, which is configured to be receptive of a second force from the first guide pin upon the second movement of the circuit breaker from the disconnected position along the second portion of the dismounting path, the second force facilitating a fourth movement of the second protrusion from a path of the first guide pin.

6. The apparatus according to claim 3, further comprising:
   a plate boss disposed on a surface of the plate;
   a toggle link boss disposed on the toggle link; and
   an elastic member, coupled to the plate and the toggle link bosses, which is configured to bias the toggle link in the locking position.

7. The apparatus according to claim 6, wherein the main body is configured to rotate in opposition to the bias about the position such that an abutment of the first protrusion with the first guide pin is released when the toggle link is not in the locking position.

8. The apparatus according to claim 1, further comprising a circuit breaker locking mechanism which is configured to lock the circuit breaker onto the base.

9. The apparatus according to claim 8, wherein the circuit breaker locking mechanism comprises:
   a cam, rotatably coupled to the plate, which is configured to prevent the circuit breaker from being dismounted from the base; and
   a cam controlling assembly by which a controller is configured to operate the cam.

10. A draw-out type circuit apparatus, including a circuit breaker configured to interrupt current in an electric circuit, the apparatus comprising:
    a base from which the circuit breaker is dismountable and movable;
    a plate, fixed to the base, comprising a slot that defines a first portion and a second portion of a dismounting path, the plate being configured to guide a first movement of the circuit breaker along the first portion of the dismounting path into a disconnected position; and a toggle link, coupled to the plate and biased toward a locking position, the toggle link being configured to:

block a second movement of the circuit breaker along the dismounting path beyond the disconnected position while the toggle link is disposed in the locking position, and to:

facilitate a third movement of the circuit breaker from the disconnected position and along the second portion of the dismounting path upon a fourth movement of the toggle link out of the locking position, the toggle link being further configured to impart a force directed to the circuit breaker upon the fourth movement of the toggle link out of the locking position.

11. The apparatus according to claim 10, further comprising first and second guide pins coupled to the circuit breaker and disposed to be guidable along and within the slot.

12. The apparatus according to claim 11, wherein the toggle link comprises:

a main body which is rotatably coupled to the plate at a position along a length thereof, the main body comprising a first protrusion disposed on a first side of the position and a second protrusion disposed on a second opposing side of the position;

the first protrusion being disposed and configured to abut the first guide pin while the circuit is in the disconnected position and while the toggle link is disposed in the locking position; and the second protrusion being disposed and configured to impart a force directed to the second guide pin when the second protrusion is rotated about the position to the second guide pin.

13. The apparatus according to claim 12, wherein the first protrusion comprises an abutment surface configured to stably abut the first guide pin.

14. The apparatus according to claim 13, wherein the second protrusion comprises:

a first surface, which is configured to impart a first force directed to the second guide pin when the second protrusion is rotated about the position to the second guide pin; and a second surface, which is configured to be receptive of a second force from the first guide pin upon the third movement of the circuit breaker from the disconnected position along the second portion of the dismounting path, the second force facilitating a fifth movement of the second protrusion from a path of the first guide pin.

15. The apparatus according to claim 13, further comprising:

a plate boss disposed on a surface of the plate;
a toggle link boss disposed on the toggle link; and
an elastic member, coupled to the plate and the toggle link bosses, which is configured to bias the toggle link in the locking position.

16. The apparatus according to claim 15, wherein the main body is configured to rotate in opposition to the bias about the position such that an abutment of the first protrusion with the first guide pin is released when the toggle link is not in the locking position.

17. The apparatus according to claim 11, further comprising a circuit breaker locking mechanism which is configured to lock the circuit breaker onto the base and which comprises:

a cam, rotatably coupled to the plate, which is configured to prevent the circuit breaker from being dismounted from the base; and a cam controlling assembly by which a controller is configured to operate the cam.

18. A method of operating a draw-out type circuit breaker apparatus, including a circuit breaker configured to interrupt current in an electric circuit, the method comprising:

dismounting the circuit breaker from a base;
moving the circuit breaker along a first portion of a dismounting path and into a disconnected position;
operating a toggle link to cause the circuit breaker to move from the disconnected position and along a second portion of the dismounting path; and
removing the circuit breaker from the dismounting path.

19. The method according to claim 18, wherein the operating of the toggle link comprises:

urging the toggle link against a bias applied to the toggle link; and ceasing the urging once the circuit breaker is caused to move from the disconnected position and along the second portion of the dismounting path.

* * * * *